(12) United States Patent
Gantzer et al.

(10) Patent No.: US 7,823,371 B2
(45) Date of Patent: Nov. 2, 2010

(54) GUIDING ARRANGEMENT FOR FORAGE PICKUP DEVICE OF AN AGRICULTURAL HARVESTER

(75) Inventors: Christian Gantzer, Woustwiller (FR); Damion D. Babler, Albany, WI (US)

(73) Assignee: Kuhn S.A., Saverne (FR)

( * ) Notice: Subject to any disclaimer, the term of this patent is extended or adjusted under 35 U.S.C. 154(b) by 0 days.

(21) Appl. No.: 12/305,985

(22) PCT Filed: Jun. 19, 2007

(86) PCT No.: PCT/FR2007/051464
§ 371 (c)(1),
(2), (4) Date: Dec. 22, 2008

(87) PCT Pub. No.: WO2008/000993
PCT Pub. Date: Jan. 3, 2008

(65) Prior Publication Data
US 2009/0282800 A1    Nov. 19, 2009

(30) Foreign Application Priority Data
Jun. 30, 2006    (FR) .................................. 06 52752

(51) Int. Cl.
*A01D 43/00* (2006.01)
(52) U.S. Cl. ...................................................... 56/190
(58) Field of Classification Search ............... 56/34, 56/341, 432, 219–225, 378, DIG. 20, DIG. 216, 56/190, DIG. 21, 364
See application file for complete search history.

(56) References Cited
U.S. PATENT DOCUMENTS

| | | | | |
|---|---|---|---|---|
| 1,819,432 A * | 8/1931 | Mickle | .......................... | 56/364 |
| 2,362,861 A * | 11/1944 | Russell | .......................... | 100/20 |
| 2,524,233 A * | 10/1950 | Russell | .......................... | 56/364 |
| 2,571,489 A * | 10/1951 | Russell | .......................... | 100/139 |
| 2,691,266 A * | 10/1954 | Meyer et al. | .................. | 56/364 |
| 2,872,772 A * | 2/1959 | Nolt | ............................. | 56/364 |
| 3,815,346 A * | 6/1974 | Nelson | ......................... | 56/364 |
| 3,924,391 A | 12/1975 | Cheatum | | |
| 4,015,410 A * | 4/1977 | Smith | ........................... | 56/364 |
| 4,304,090 A * | 12/1981 | Gavrilenko et al. | ........... | 56/364 |
| 4,411,127 A * | 10/1983 | Diederich et al. | ............. | 56/364 |
| 4,495,756 A * | 1/1985 | Greiner et al. | ................ | 56/364 |
| 4,516,389 A * | 5/1985 | Core | ............................ | 56/341 |
| 6,295,797 B1 * | 10/2001 | Naaktgeboren et al. | ....... | 56/364 |
| 6,314,709 B1 * | 11/2001 | McClure et al. | ............... | 56/364 |
| 6,688,092 B2 * | 2/2004 | Anstey et al. | .................. | 56/220 |
| 6,810,650 B2 * | 11/2004 | McClure | ..................... | 56/190 |

(Continued)

FOREIGN PATENT DOCUMENTS

| | | |
|---|---|---|
| EP | 0 070 942 | 2/1983 |
| FR | 2 432 830 | 3/1980 |
| GB | 2 215 971 | 10/1989 |
| WO | 2005/041638 | 5/2005 |

*Primary Examiner*—Árpád Fábián-Kovács
(74) *Attorney, Agent, or Firm*—Oblon, Spivak, McClelland, Maier & Neustadt, L.L.P.

(57) ABSTRACT

An agricultural machine for harvesting forage including a frame supporting at least one device for picking up plants lying on the ground and at least one device for moving the plants that have been picked up. The machine includes a device for guiding the plants which is situated at least partially above and at a short distance from the pickup device and which is supported by arms which extend rearward above the moving device and whose rear ends are articulated relative to the frame by means of substantially horizontal axes situated, during work, above the rear portion of the moving device and about which they can pivot through a certain angle.

13 Claims, 3 Drawing Sheets

U.S. PATENT DOCUMENTS

| | | | |
|---|---|---|---|
| 6,935,094 B1 * | 8/2005 | McClure | 56/190 |
| 7,107,748 B2 * | 9/2006 | McClure | 56/190 |
| 7,448,196 B2 * | 11/2008 | Schrag et al. | 56/341 |
| 2006/0277888 A1 * | 12/2006 | Erdmann et al. | 56/344 |
| 2006/0277889 A1 * | 12/2006 | Sheedy et al. | 56/364 |
| 2008/0264028 A1 * | 10/2008 | Woodford | 56/16.4 R |

* cited by examiner

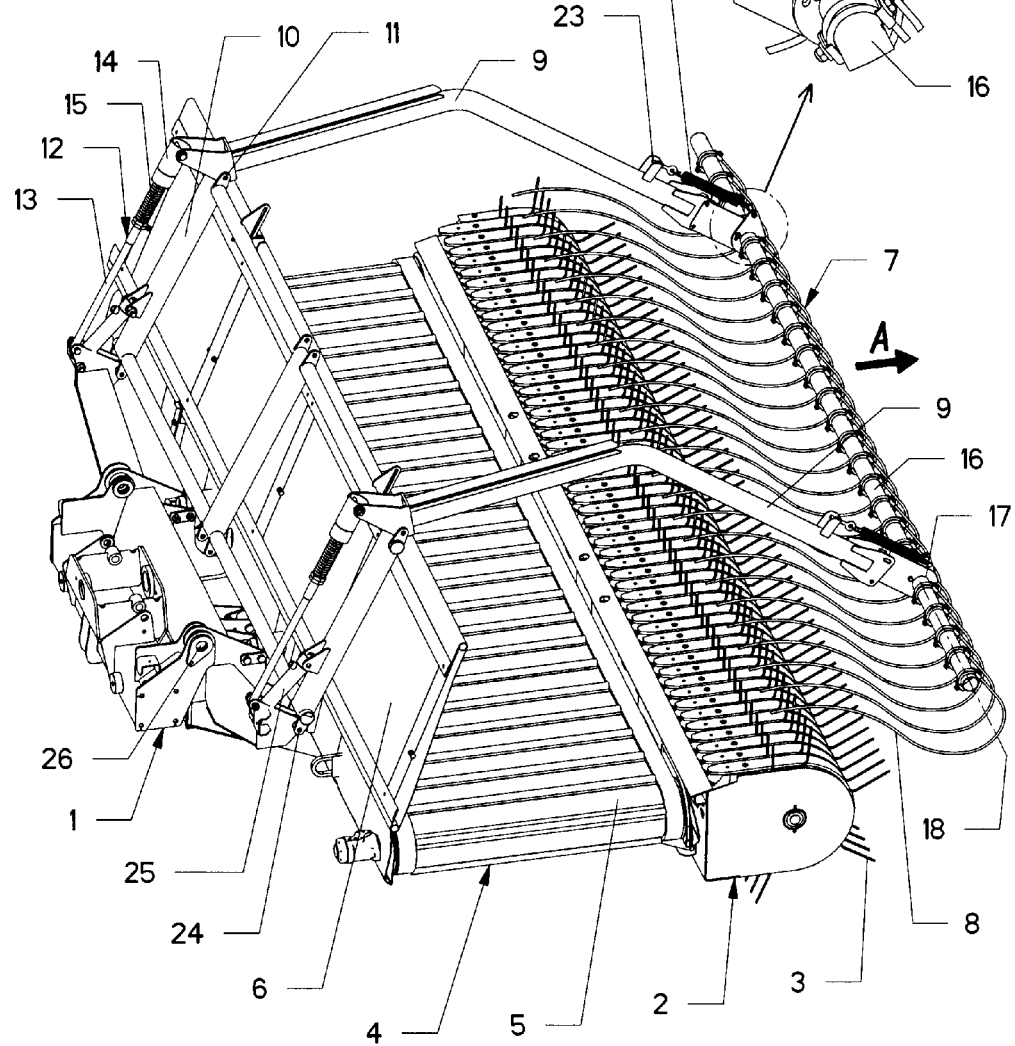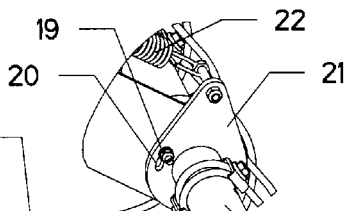

GUIDING ARRANGEMENT FOR FORAGE PICKUP DEVICE OF AN AGRICULTURAL HARVESTER

BACKGROUND OF THE INVENTION

1. Field of the Invention

The present invention relates to an agricultural machine for harvesting forage comprising a frame supporting at least one device for picking up plants lying on the ground and at least one device for moving the plants that have been picked up, which moving device is situated close to the pickup device and moves said plants transversely to the latter.

This machine makes it possible to pick up plants spread out on the ground and to move them laterally for the purpose of placing them in windrows. It is then possible to pick up these windrows for example by means of a baler or a forage harvester.

2. Discussion of the Background

A machine of this type is known in patent application WO 2005/041638. This machine comprises several pickup devices and moving devices in order to increase its working width. On this machine, the plants can accumulate at times on any one of the pickup devices and therefore travel in an irregular manner over the corresponding moving device. This may cause the blockage of the moving device as well as the formation of a windrow of inconstant volume that is able to disrupt the operation of picking it up with the baler or the forage harvester.

SUMMARY OF THE INVENTION

The particular object of the present invention is to propose a machine picking up and moving the plants in a more even manner.

Accordingly, an important feature of the invention consists in that the machine comprises a device for guiding the plants which is situated at least partially at a short distance above the pickup device and which is supported by arms which extend rearward above the moving device and are articulated relative to the frame by means of substantially horizontal shafts situated close to their rear ends and about which they may pivot through a certain angle.

This guide device interacts with the pickup device in order to cause the plants to travel evenly on the moving device. It keeps these plants in contact with the pickup device which promotes their driving by the latter and therefore prevents any harmful accumulation.

The carrier arms which extend over the moving device and which are connected to supports of the frame are remote from the plants in movement. Consequently, the latter do not risk at any time being caught on the arms and accumulating thereon.

The articulations of the arms supporting the guide device allow the whole guide device to be close to the pickup device while being able to move away therefrom, respectively move closer thereto automatically depending on the density of the plants that have been picked up.

According to another feature of the invention, the supports to which the carrier arms are connected are linked to the frame by means of substantially horizontal axes about which they may be moved into various positions. Said supports therefore make it possible to move the guide device into a working position as described above and a position suitable for transport.

Other features and advantages of the invention will emerge from the following description which refers to the appended drawings which represent, as a nonlimiting example, an embodiment of the machine according to the invention.

BRIEF DESCRIPTION OF THE DRAWINGS

In these drawings:

FIG. 1 represents an overview of an arrangement according to the invention in the working position, FIG. 2 represents a detail view of the arrangement according to FIG. 1.

DESCRIPTION OF THE PREFERRED EMBODIMENT

Figure 3:
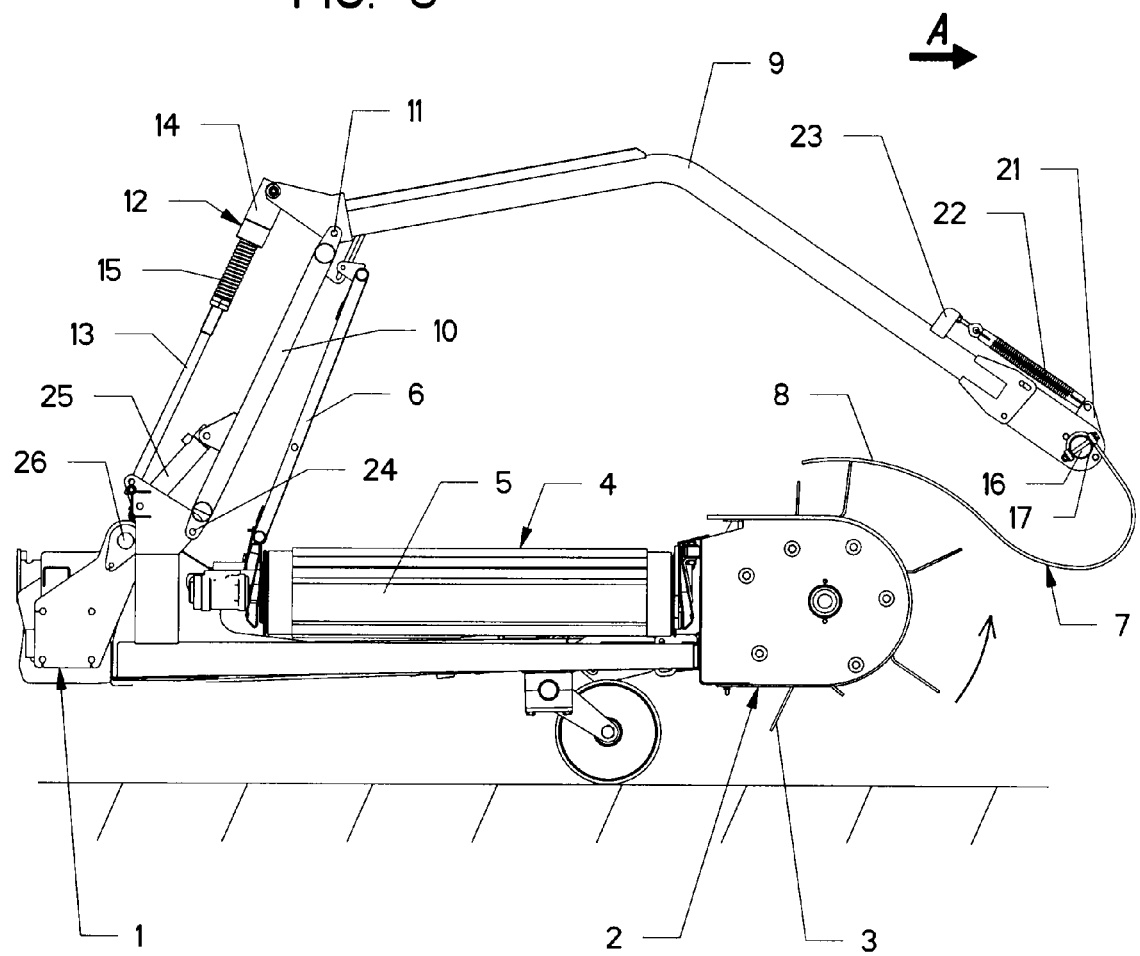
FIG. 3 represents a side view of the arrangement according to FIG. 1.

The agricultural machine according to the invention comprises a frame (1) that can be connected in a manner known per se to a tractor allowing it to be moved in a direction of travel (A). As emerges from FIGS. 1 to 3, this frame (1) supports a device (2) for picking up plants on the ground which is of the pickup type. It comprises a rotor with controlled tines (3) which is driven in rotation so that said tines (3) pick up the plants on the ground, lift them and throw them rearward.

At the rear of the pickup device (2) a device (4) for moving the plants is provided. The latter is situated immediately next to the pickup device (2) so that it receives the plants thrown rearward by the latter. This moving device (4) consists of a conveyor belt (5) which is driven during work so that it moves said plants transversely to the pickup device (2) toward the right side or left side of the machine. The plants are then laid down again on the ground in the form of a windrow for the purpose of being picked up later. On the rear side of the moving device (4), a substantially vertical deflector (6) is placed which limits the rearward throw of the plants and makes them pass in totality onto said moving device (4).

The machine may comprise several pickup devices (2) and moving devices (4) placed side by side for the purpose of increasing its working width.

According to the invention, a device (7) for guiding the plants is placed at least partially above and at a short distance from the pickup device (2). It is made up of flexible rods (8) that are substantially parallel and that extend from the front of the pickup device (2) rearward while coming closer to the ends of the tines (3) of the latter. When picked up by the tines (3), the plants come into contact with the rods (8) and slide rearward along the latter. These rods (8) also keep the plants in contact with the tines (3) in order to obtain an even conveyance toward the moving device (4).

The guide device (7) is supported by arms (9) which extend rearward above the moving device (4) and which are connected close to their rear ends to supports (10) connected to the frame (1). These arms (9) are therefore remote from the pickup device (2) and from the moving device (4) so as not to hamper the movements of the plants.

The arms (9) are articulated on said supports (10) by means of substantially horizontal axes (11) situated close to their rear ends. In the working position, these axes (11) are positioned above the rear portion of the moving device (4). The arms (9) can pivot through a certain angle about these axes (11). This angle of pivoting of the arms (9) about these articulation axes (11) is limited by means of abutments (12). Each of these abutments (12) consists of a rod (13) of which one of the ends is articulated on the frame (1) and the other end is engaged in a sheath (14) which is articulated on the end of one of the arms (9). The end engaged in the sheath (14) is provided with a shoulder situated between two stops placed at the two ends of said sheath (14). Said stops limit the possible range of movement of the sheath (14) relative to the shoulder of the rod (13) and consequently the angle of pivoting of the arms (9) of the guide device (7) about the articulation axes (11). Between the rod (13) and the sheath (14) of each abutment (12) a compression spring (15) is placed. The latter exerts a pressure on the corresponding sheath (14) which tends to cause the arms (9) and the guide device (7) to pivot in the direction of the pickup device (2) in order to keep said guide device (7) in contact with the plants being moved. In addition, this spring (15) damps the movements of the arms (9) about the articulation axes (11).

The rods (8) of the guide device (7) are attached to a bar (16) housed in an orifice (17) of each arm (9). The diameter of the bar (16) is slightly less than that of the orifices (17) so as to be able to pivot about its longitudinal geometry axis (18). The angle of pivoting about this axis (18) is limited to a value of approximately 20° by means of abutments (19) which are placed on the arms (9) and which are engaged in oblong holes (20) provided in lugs (21) rigidly fastened to the bar (16) (see FIG. 2).

Draw-springs (22) are coupled to the lugs (21) of the bar (16) and to yokes (23) provided on the arms (9). These springs (22) pull on the bar (16) so as to make it pivot with all of the rods (8) about the longitudinal axis (18) in the direction of the pickup device (2). This pivoting makes it possible to exert a slight pressure on the plants in order to promote their movement by the tines (3).

The supports (10) of the arms (9) are linked to the frame (1) by means of substantially horizontal articulation axes (24) situated at the rear of the moving device (4) and about which they may be moved. These supports (10) therefore form, together with the abutments (12), the ends of the arms (9) and of the portions of the frame (1), deformable parallelograms. These parallelograms make it possible to move and keep the arms (9) and the guide device (7) in various positions where they are more or less close to the pickup device (2) and the moving device (4). For this purpose, the machine comprises, between the frame (1) and the supports (10), hydraulic cylinders (25) making it possible to move these supports (10) about the axes (24). These cylinders (25) may be controlled from the tractor so that they carry out said movements.

Figure 4:
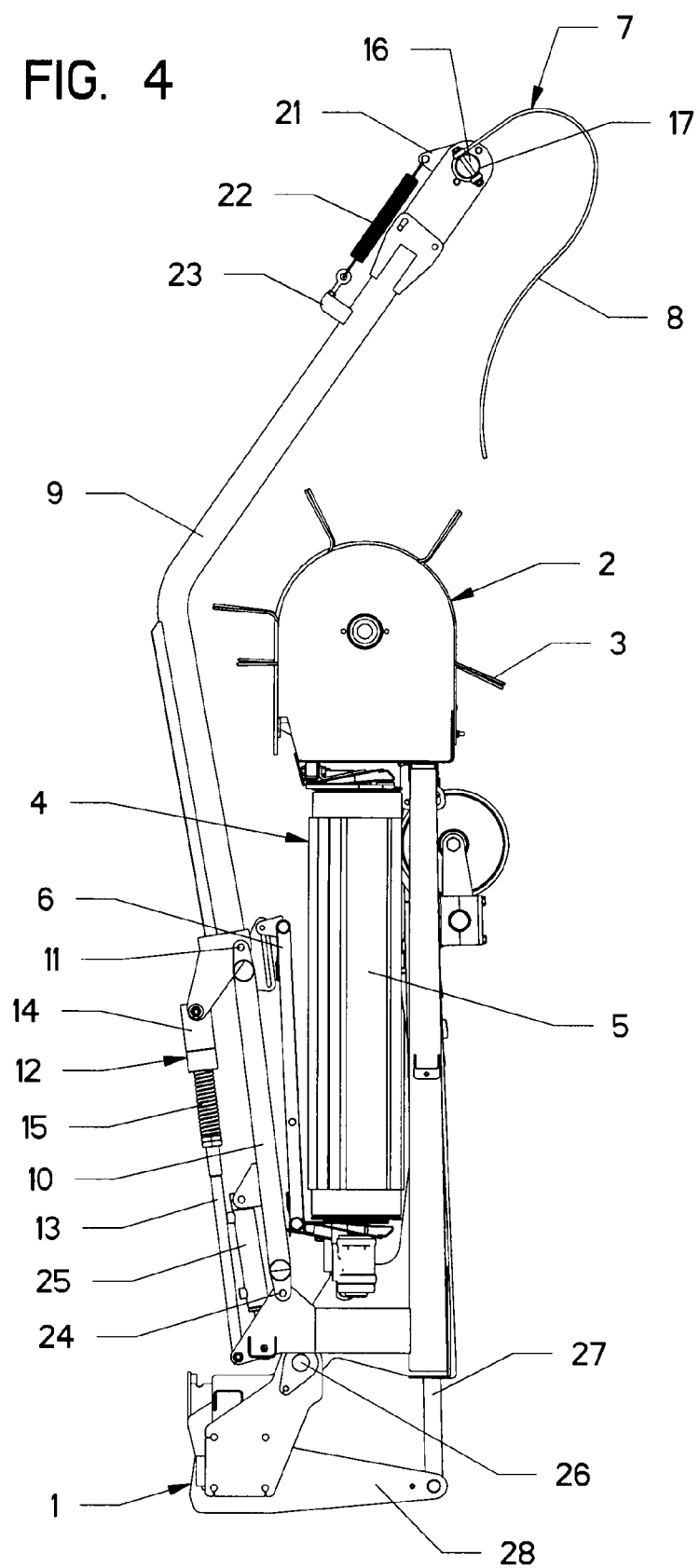
FIG. 4 represents a side view of the arrangement in a transport position.

This arrangement also makes it possible to transpose the machine into a road transport position in which its dimensions are reduced (see FIG. 4). In this position, the arms (9) are brought into a position very close to the moving device (4), the guide device (7) then being situated substantially in the extension of the pickup device (2) and these three devices (4, 7 and 2) also being moved together into a substantially vertical position about a substantially horizontal axis (26) of the frame (1). This movement into a substantially vertical position is carried out by means of a hydraulic cylinder (27) placed under the moving device (4) and pressing on a lever (28) of the frame (1). In this position, these devices (4, 7 and 2) may also be folded together rearward or forward with a portion of the frame (1), about a substantially vertical axis in order to be oriented in the direction of travel (A).

It is evident that the invention is not limited to the embodiment described above and represented in the appended drawings. Modifications remain possible, especially with respect to the constitution or the number of the various elements or by substitution of technical equivalents, nevertheless without departing from the field of protection as defined in the claims.

What is claimed as new and desired to be secured by Letters Patent of the United States is:

1. An agricultural machine for windrowing of forage, the machine comprising:
  a frame,
  at least one pickup device that picks up plants lying on the ground,
  at least one conveyor belt which is situated behind to the pickup device and extends over the entire length of said pickup device,
  a plants guiding device situated at least partially above and at a short distance from said a least one pickup device,
  support arms that support the guiding device, said arms extending rearward over the conveyor belt and having rear ends,
  at least one substantially horizontal axis situated, while the agricultural machine is in a work position, above a rear portion of the conveyor belt, said rear ends of the support arms being articulated on the at least one substantially horizontal axis so that they can pivot through a certain angle,
  at least one spring exerting an action on the support arms which urges the arms and the guiding device to pivot in the direction of the pickup device,
  wherein the at least one substantially horizontal axis is situated on supports linked to the frame,
  the agricultural machine further comprising abutments that limit the angle of pivoting of the arms about their articulation axis on the supports linked to the frame.

2. The agricultural machine as claimed in claim 1, wherein each abutment consists of a rod connected to the frame and engaged in a sheath which is connected to one of the arms and which comprises stops that limit the movements of the sheath and of the corresponding arm relative to the rod.

3. The agricultural machine as claimed in claim 2, wherein the spring is a compression spring situated between the rod and the sheath of each abutment.

4. The agricultural machine as claimed in claim 1, wherein the guide device is housed in an orifice of each arm so as to be able to pivot about a longitudinal geometric axis, at an angle limited by means of abutments.

5. The agricultural machine as claimed in claim 4, comprising at least one draw-spring coupled to one arm and to the guide device in order to cause the latter to pivot about the longitudinal geometric axis in the direction of the pickup device.

6. The agricultural machine as claimed in claim 1, wherein the supports are connected to the frame by substantially horizontal axes about which axes the supports can be moved into various positions for work and for transport.

7. The agricultural machine as claimed in claim 6, comprising hydraulic cylinders placed between the frame and the supports in order to move the supports about their articulation axes into the various positions.

8. The agricultural machine as claimed in claim 6, wherein the supports form deformable parallelograms with the abutments, the ends of the arms and of portions of the frame.

9. The agricultural machine as claimed in claim 1, wherein the at least one substantially horizontal axis is disposed farther from a front of the machine than is the conveyor belt.

10. The agricultural machine as claimed in claim 1, wherein the conveyor belt is configured to move forage to an outer lateral side of the machine.

11. The agricultural machine as claimed in claim 1, wherein the arms extend from the at least one substantially horizontal axis toward a front of the machine.

12. The agricultural machine as claimed in claim 1, wherein the plants guiding device directly faces the pickup device.

13. The agricultural machine as claimed in claim 12, wherein the plants guiding device extends from one end of the support arms rearward toward a front end of the pickup device.

* * * * *